(12) United States Patent
Tycast

(10) Patent No.: US 7,047,248 B1
(45) Date of Patent: May 16, 2006

(54) DATA PROCESSING SYSTEM AND METHOD FOR ARCHIVING AND ACCESSING ELECTRONIC MESSAGES

(75) Inventor: Robert Leonard Tycast, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1540 days.

(21) Appl. No.: 08/974,573

(22) Filed: Nov. 19, 1997

(51) Int. Cl.
*G06F 17/00* (2006.01)

(52) U.S. Cl. .................................................. 707/102

(58) Field of Classification Search ................ 707/10, 707/1, 9, 513, 523, 100–102, 104.1, 204, 707/205; 379/87, 88; 395/200.3; 715/513, 715/523
See application file for complete search history.

(56) References Cited

U.S. PATENT DOCUMENTS

| | | | | |
|---|---|---|---|---|
| 4,887,077 A | * | 12/1989 | Irby, III et al. | 340/825.47 |
| 5,258,751 A | * | 11/1993 | DeLuca et al. | 340/825.44 |
| 5,265,033 A | * | 11/1993 | Vajk et al. | 364/514 |
| 5,325,310 A | * | 6/1994 | Johnson et al. | 364/514 |
| 5,359,317 A | * | 10/1994 | Gomez et al. | 340/825.44 |
| 5,473,143 A | * | 12/1995 | Vajk et al. | 235/380 |
| 5,530,740 A | * | 6/1996 | Irribarren et al. | 379/89 |
| 5,659,746 A | * | 8/1997 | Bankert et al. | 707/205 |
| 5,675,507 A | | 10/1997 | Bobo, II | 364/514 |
| 5,737,395 A | * | 4/1998 | Irribarren | 379/88 |
| 5,758,354 A | * | 5/1998 | Huang et al. | 707/201 |
| 5,781,901 A | * | 7/1998 | Kuzma | 707/10 |
| 5,790,793 A | * | 8/1998 | Higley | 395/200.48 |
| 5,802,314 A | * | 9/1998 | Tullis et al. | 395/200.76 |
| 5,812,769 A | * | 9/1998 | Graber et al. | 395/200.12 |
| 5,818,447 A | * | 10/1998 | Wolf et al. | 345/335 |
| 5,857,187 A | * | 1/1999 | Uenoyama et al. | 707/8 |

(Continued)

FOREIGN PATENT DOCUMENTS

EP 0890909 A2 7/1998

(Continued)

OTHER PUBLICATIONS

Goldberg et al, "Using Collaborative Filtering to Weave an Information Tapestry", Communications of the ACM, Dec. 1992.*

(Continued)

*Primary Examiner*—Uyen Le
(74) *Attorney, Agent, or Firm*—Jeffrey S. LaBaw

(57) ABSTRACT

A data processing system and method archive, retrieve, and store electronic messages in a communication system, such as the Internet. The data processing system and methodology convert electronic mail messages to HTML documents, or web pages to provide greater flexibility for users of the communication system. By storing electronic mail messages as web pages, each of the mail messages may become a page or a group of pages in a "web" using the HTML format. Alternatively, only a portion of the mail messages could be converted to an alternate format. During operation of the data processing system and methodology, individual pieces of electronic mail are assigned to a corresponding URL. The mail messages are then organized into categories of web pages, that may be accessed using the full capabilities of currently available and evolving network tools, such as browsers.

27 Claims, 4 Drawing Sheets

U.S. PATENT DOCUMENTS

| | | | |
|---|---|---|---|
| 5,864,871 A * | 1/1999 | Kitain et al. | 707/104.1 |
| 5,870,546 A * | 2/1999 | Kirsch | 395/200.33 |
| 5,870,549 A * | 2/1999 | Bobo, II | 395/200.36 |
| 5,870,552 A * | 2/1999 | Dozier et al. | 395/200.49 |
| 5,870,559 A * | 2/1999 | Leshem et al. | 395/200.54 |
| 5,877,767 A * | 3/1999 | Yohanan | 345/357 |
| 5,878,219 A * | 3/1999 | Vance, Jr. et al. | 395/200.47 |
| 5,902,353 A * | 5/1999 | Reber et al. | 709/219 |
| 5,903,729 A * | 5/1999 | Reber et al. | 709/219 |
| 5,915,001 A * | 6/1999 | Uppaluru | 379/88.22 |
| 5,953,732 A * | 9/1999 | Meske, Jr. et al. | 707/513 |
| 5,987,454 A * | 11/1999 | Hobbs | 707/4 |
| 6,009,442 A * | 12/1999 | Chen et al. | 707/522 |
| 6,029,192 A * | 2/2000 | Hill et al. | 709/206 |
| 6,081,827 A * | 6/2000 | Reber et al. | 709/200 |

FOREIGN PATENT DOCUMENTS

| | | | |
|---|---|---|---|
| JP | 7-325827 A | | 12/1995 |
| JP | 11-25015 | | 1/1999 |
| WO | WO 96/31826 | | 10/1996 |
| WO | 97/44726 | * | 11/1997 |
| WO | WO 98/03928 | | 1/1998 |
| WO | 98/32066 | * | 7/1998 |

OTHER PUBLICATIONS

Pandit et al "The Selection Recognition Agent: Instant Access to Relevant Information and Operations", ACM 1997, pp. 47-52.*

Roy Rada, "Converting a Textbook to Hypertext", ACM 1992, pp. 294-315.*

Web page—"Netscape Messenger Full-Featured, Open Standards-Based Email", available via the Internet at http://Netscape Communicator | Messenger, attached copy printed Oct. 7, 1997, pp. 1-2.

Web page—"Handbook: Mail, News, and Bookmarks", Netscape Handbook, available via the Internet at http://home.netscape.com/eng/mozilla/3.0/handbook/docs/mmb.html#C11, attached copy printed Jul. 2, 1997, pp. 1-16.

Jill Ellsworth et al., *The Internet 1997 Unleashed*, Copyright 1997, pp. 976-977 and 583-589.

"LISTSERV," via Internet at http://www.lsoft.com/products/listserv.asp, pp. 1-3.

"Hypermail—Tools," via Internet at http://www.w3.org/Tools/Hypermail.html, p. 1.

* cited by examiner

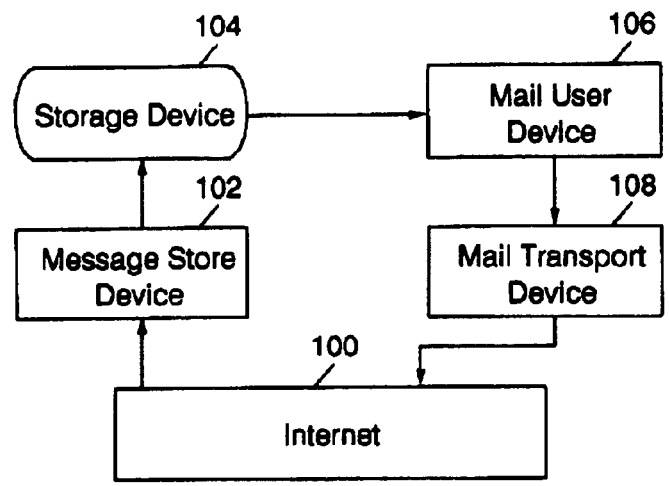
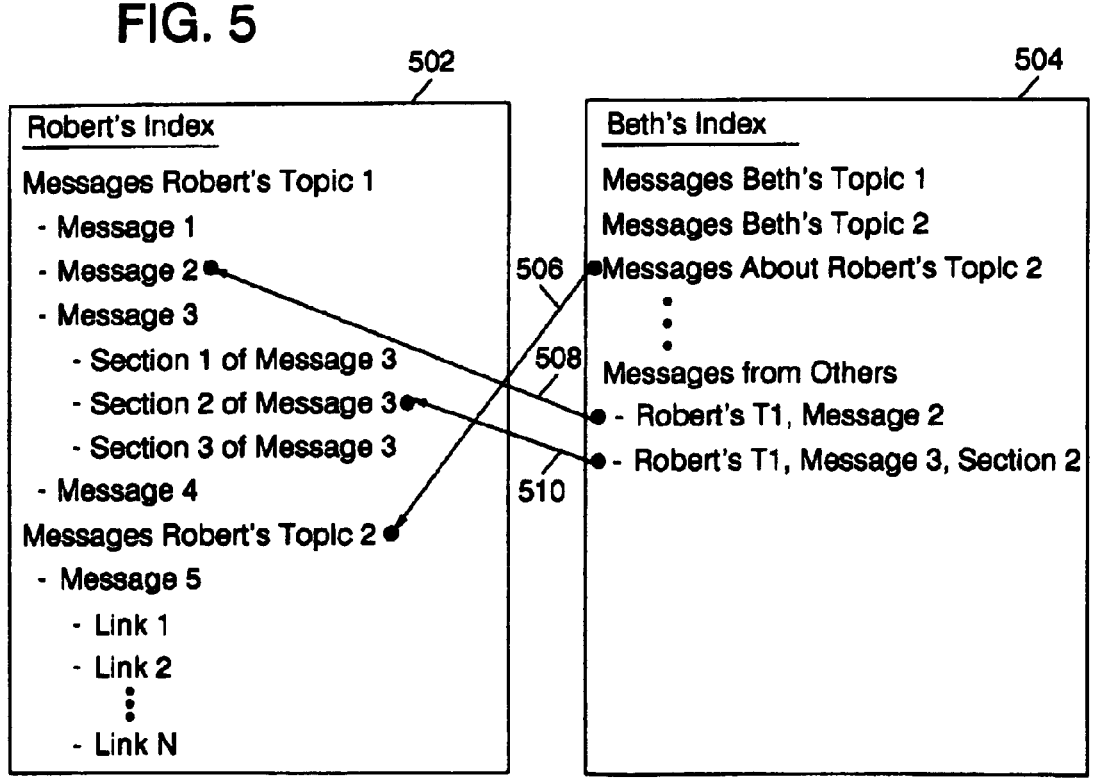

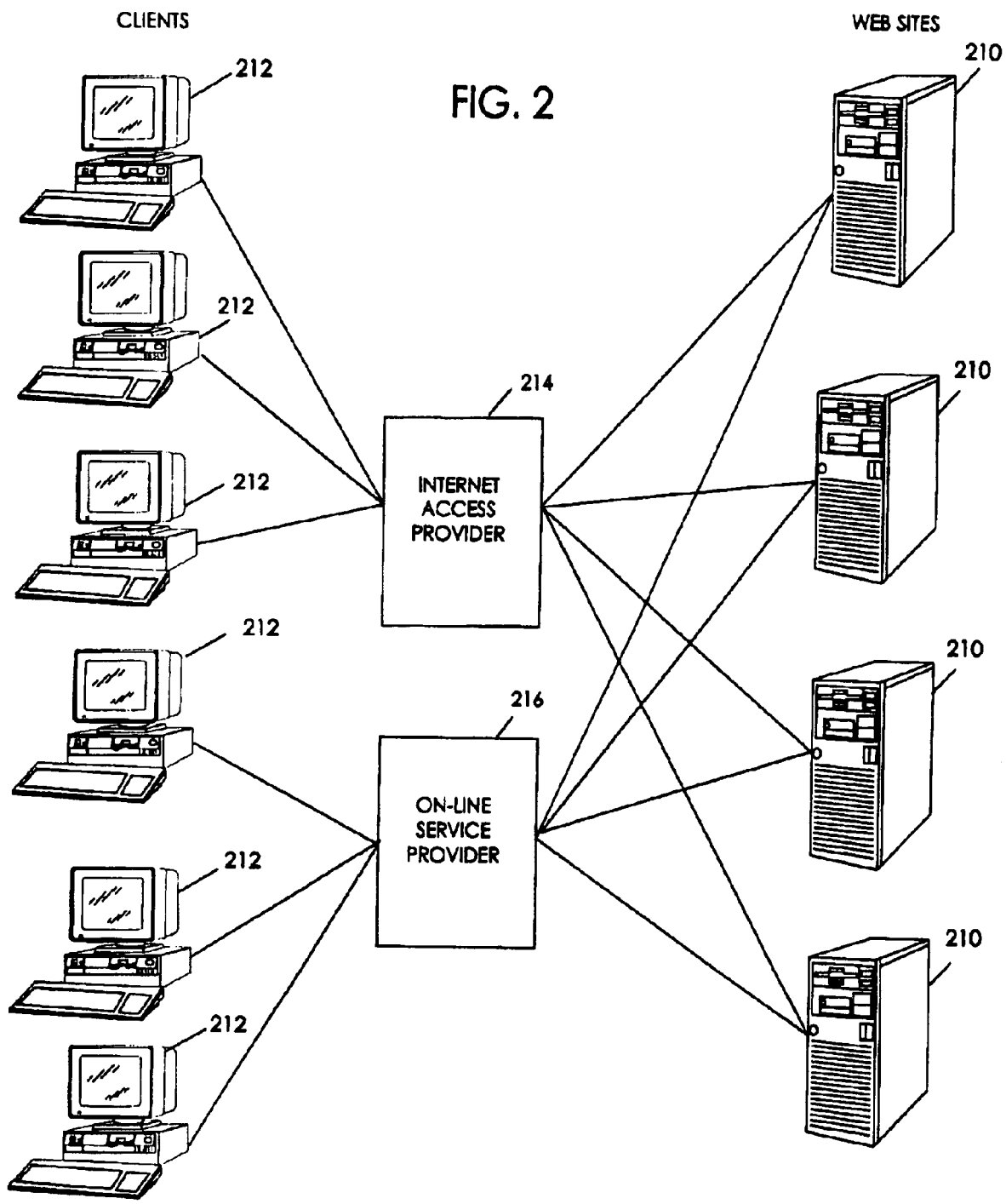

DATA PROCESSING SYSTEM AND METHOD FOR ARCHIVING AND ACCESSING ELECTRONIC MESSAGES

TECHNICAL FIELD

The present invention relates in general to a data processing system and method for accessing and organizing electronic messages and, more particularly, to a data processing system and method for accessing and organizing electronic messages in a hypertext markup language.

BACKGROUND INFORMATION

The worldwide network of computers commonly known as the "Internet" has seen explosive growth in the last several years. This growth has been typically fueled by the introduction and widespread use of "web" browsers that allow for simple graphical user interface-based access to network servers. Such network servers typically support documents formatted as "web pages." The "World Wide Web" (WWW) is a collection of servers on the Internet that utilize the Hypertext Transfer Protocol (HTTP). HTTP is a known application protocol that provides users access to files using a standard page description language referred to as Hypertext Markup Language (HTML). It should be noted that files may be provided in different formats, such as text, graphics, images, sound, and video, among others. HTML provides basic document formatting and allows the developer to specify "links" to other servers and files. Use of an HTML-compliant client browser involves specification of a link via a Uniform Resource Locator (URL). Upon specification of a URL, a client may make a TCP/IP request to the server identified in the link and receive a "web page" in return, where the "web page" is a document formatted according to HTML.

Currently, the Internet is primarily used by individuals who wish to access information and services. Among the services provided by the Internet are electronic mail messaging services that allow users to communicate with one another easily and in a timely manner, regardless of the physical location of the users.

FIG. 1 illustrates a standard electronic mail system configuration implemented within a communication network. During the operation of such standard electronic mail configuration, a message store device 102 receives incoming mail and places it in a storage device 104. A mail user device 106 often accesses messages stored in storage device 104 and provides an interface to a user of the electronic mail system. When the user wishes to transmit mail, a message is composed using mail user device 106 and passed to a message transport device 108. Message transport device 108 determines that the mail is correctly addressed and packaged for transport within the communication network. Operation and an architecture of a typical electronic mail device will be discussed below.

In a classical electronic mail configuration, a message store agent (MSA) collects incoming mail and places it in a message storage device. A mail user agent (MUA), often the separate program, reads the messages stored in the message storage device and presents and interface to an external user. When the user wishes to transmit mail, the message is composed using the MUA and passed to a message transport agent (MTA) that insures the mail is correctly addressed and packaged for transport on a communication network. Other electronic mail systems may include mail sent to devices that are intermittently connected to the network. In such systems, the MUA is replaced with a mail server that services requests over an intermittent line from a mail proxy device. At the request of the mail proxy device, a copy of the mail in the message storage device is copied to a storage device of an off-net machine. The mail server then proceeds in a similar manner to that described above and the elements in the mail server, including the message storage device and the MTA function as previously described. Outgoing mail may be formatted for delivery on the off-net machine and delivered via mail proxy to the mail server for delivery to the communication network. Transactions between the off-net machine and the mail server on a machine that is continuously on the net occur only when the connection is active.

While such conventional electronic mail messaging systems work adequately for most applications, such conventional electronic mail systems have certain limitations. Specifically, electronic mail systems such as those discussed above, are inflexible and fail to allow a user to index or cross-reference messages in a convenient or easily usable manner. Additionally, when new communication networks and new applications are developed, a user may not generally modify the protocol within the electronic mail messaging system to communicate with the newer applications because such conventional electronic mail systems are implemented with a proprietary format that is inaccessible and unmodifiable by a user. Furthermore, such conventional electronic mail systems do not allow for messages to be shared in an easy manner. Rather, a user must take a separate action to forward a message to another party, or make arrangements to share the information with others through an exchange of passwords, or the like. Thus, while there has been an intermingling of the functionality of the Internet with the more traditional electronic mail messaging systems, the traditional electronic mail messaging system has not kept pace with technology advances spurred by the development of the WWW. Therefore, a need exists for an electronic mail messaging system that allows users to have greater flexibility when storing, receiving, and archiving electronic mail messages. Furthermore, a need exists for a messaging system that responds to the changing technology found on the WWW.

Furthermore, such conventional electronic mail messaging systems fail to provide a user with flexibility in organizing mail messages, and other HTML documents, that have been received by a user via a communication network. Such conventional electronic mail messaging systems may provide methods for sorting messages based upon the urgency of the message or a date or time at which the message was received. However, the user may desire to organize mail messages in accordance with their own needs or use. Lotus Notes™ provides an example of an electronic messaging system. Users can store received messages by specifying one or more categories that apply to them. It should be noted that the message arrives uncategorized. When the user elects to store the message, the electronic mail (e-mail) system presents the users with the opportunity to determine the categories to be associated with the message. If the user wishes, the user can also create new categories and associate them with the message, in addition to, or instead of any pre-existing categories that may have existed.

While this system of categories is very useful for searching an e-mail database, it suffers from the aforementioned limitations. Specifically, the user cannot index a portion or a subsection of a message. In Lotus Notes, the finest level of allowed detail is a whole message. This may prove to be unduly limiting to many users. Additionally, Lotus Notes does not allow the use of general purpose tools on an archived message. The messages are stored in a proprietary format which precludes their access from any tool except one explicitly knowledgeable of the format. Furthermore, Lotus Notes does not allow a user to easily share the archive or a portion of the archive. Rather, users can share messages by creating a shared database on a common server in a cumbersome process that requires all of the users sharing the archive to have the same software installed.

Therefore, a need exists for a data processing system and method that allows a user to organize received documents into categories of their own choosing using HTML.

SUMMARY OF THE INVENTION

The previously mentioned needs are fulfilled with the present invention. Accordingly, there is provided, in a first form, a method for organizing data in a data processing system. The method includes the steps of retrieving a plurality of electronic mail messages from a communication device and selectively converting the plurality of electronic mail messages to a first format to generate a first plurality of converted data values. The method also includes the steps of generating a first identifier for the plurality of electronic mail messages and storing the plurality of electronic mail messages in a storage device in a first location identified by the first identifier.

Additionally, there is provided, in a second form, a communication network. The communication network includes a device for accessing a plurality of electronic mail messages and a conversion device for converting the plurality of electronic mail messages to a first format to generate a first plurality of converted data values. The conversion device is connected to the device for accessing. The communication network also includes an identification circuit for generating an identifier corresponding to the first plurality of converted data values. A storage circuit is connected to the conversion device for receiving the first plurality of the converted data values and is connected to the identification circuit for receiving the identifier. The storage circuit stores the first plurality of converted data values in the storage location corresponding to the identifier.

Furthermore, there is provided, in a third form, a method for organizing electronic documents in a computer network. The method includes the steps of organizing a plurality of electronic documents into a plurality of groups and defining a uniform resource locator to each of the plurality of groups.

Additionally, there is a provided, in a fourth form, an electronic mail system. The electronic mail system includes a category creator device for creating a plurality of categories for grouping a plurality of electronic mail documents. Each of the plurality of categories is assigned a uniform resource locator. The electronic mail system also includes an electronic mailbox for receiving a plurality of electronic mail documents. The electronic mail system also includes a user-interactive device for selectively assigning each of the plurality of electronic mail documents to one of the plurality of categories. Each of a plurality of assigned electronic mail documents is assigned a uniform resource locator corresponding to the uniform resource locator of one of the plurality of categories.

Additionally, there is provided, in a fifth form, a computer program product in a computer-readable medium for organizing electronic documents in a computer network. The computer program product incudes a device for organizing electronic documents into a plurality of groups and a device for assigning a uniform resource locator to each of a plurality of groups.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention and the advantages thereof, reference is now made to the following descriptions taken in conjunction with the accompanying drawings, in which:

FIG. 1 illustrates, in block diagram form, an electronic messaging system;

FIG. 2 illustrates, in block diagram form, a typical Internet communication system in accordance with one embodiment of the present invention;

FIG. 5 illustrates, in block diagram form, indexes created in accordance with one embodiment of the present invention.

DETAILED DESCRIPTION

Figure 3:
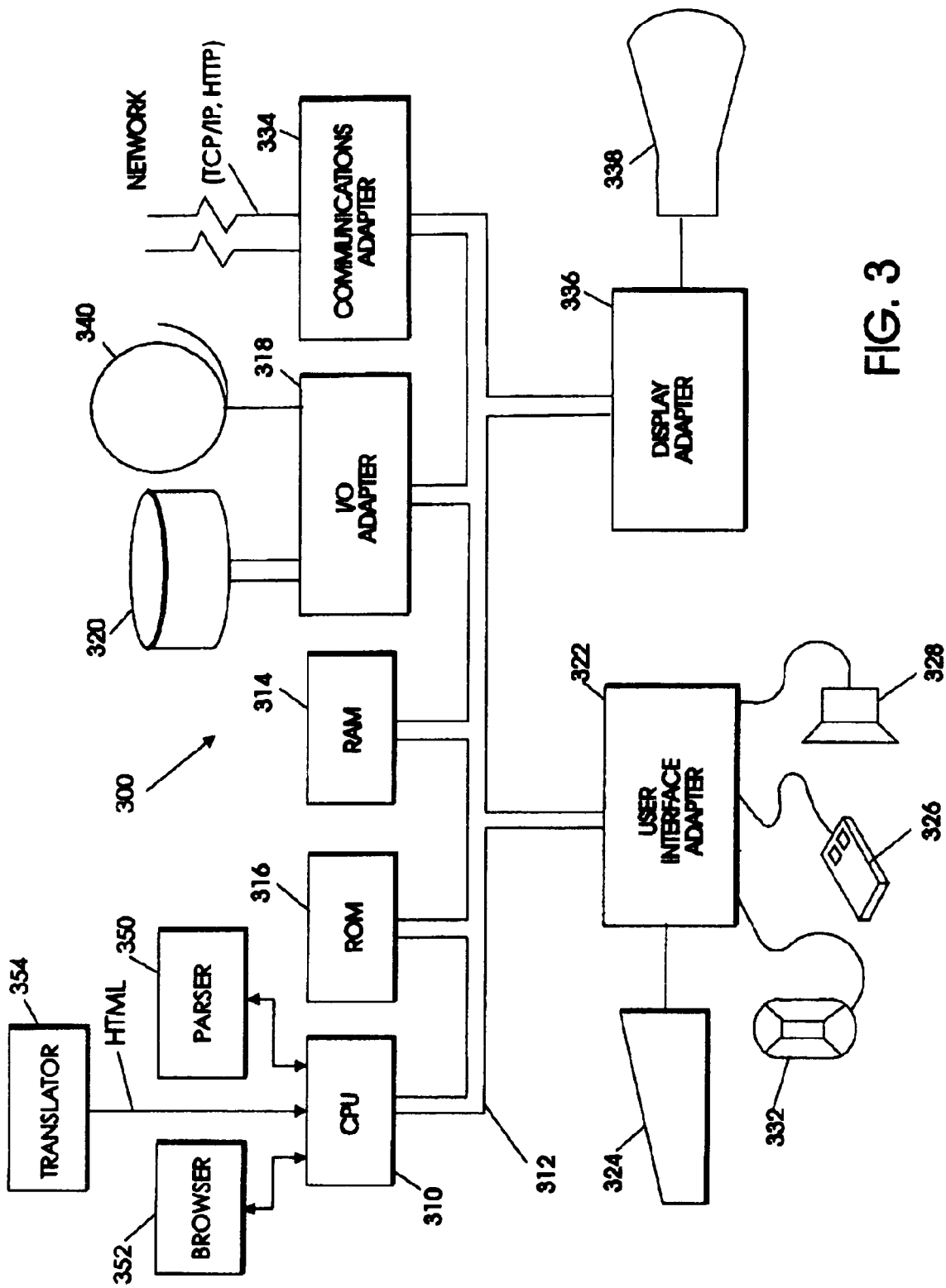
FIG. 3 illustrates, in block diagram form, a data processor in accordance with one embodiment of the present invention.

The present invention implements a data processing system and methodology for archiving, retrieving, and storing electronic mail messages in a communication system, such as the Internet. By converting the electronic messages to HTML documents (web pages), the data processing system and methodology of the present invention provide greater flexibility for users of the communication system. By storing electronic mail messages as web pages, each of the mail messages may become a page or a group of pages in a "web" using the previously described HTML format. It should be noted that it is not required that the entire message be placed in a HTML format, as other languages or protocols may be embedded in the web page format. For example, portions of the messages could be converted into embedded MIME types in alternate embodiments of the present invention. Furthermore, as the data processing system and methodology of the present invention is based upon an HTML standard in one embodiment thereof, the present invention allows archives of electronic messages to be accessed by any and all tools designed for use on documents and on the World Wide Web, such as search engines. This accessibility is very useful as it allows the present invention to take advantage of the technology and tools available to web users without modifying an archive format.

Furthermore, it should be noted that the present invention implements a data processing system and methodology for organizing electronic mail messages, as well as other HTML documents, into storage spaces that may be characterized in accordance with the desires of an external user. Such storage spaces will provide a convenient and easily recognizable manner for storing HTML documents within the Internet or another communication network. In one embodiment of the present invention, such storage spaces may be implemented as folders. Thus, the present invention allows archives of electronic mail messages to be shared among users in a very natural and easily navigable manner. Specifically, the present invention allows these archives to be shared through steps that are implemented as easily as browsing a web site. As previously stated, any web browser may be used. Furthermore, since browsers are available for almost every operating system platform, there is no specific requirement for users sharing the archive to have the same software platform installed. Also, sharing may occur at as fine a level as desired by a user. For example, the user may have access to a complete archive, a set of messages in an archive, a single message, or even merely a portion of a single message.

During implementation of the data processing system and methodology of the present invention, individual pieces of electronic mail would be assigned a corresponding URL. In one embodiment of the present invention, the URLs of the mail messages or even sub-sections of those mail messages may be generated in response to a category in which the message is included. Furthermore, in one embodiment of the present invention, each of the categories for storing the individual pieces of mail, the mail messages themselves, sub-sections of the mail messages and even URLs embedded in the mail messages may be linked to one another using hyperlink technology such that useful and flexible indexing and cross-reference functions may be generated. Furthermore, the organization of electronic messages as web pages allows users to implement the full capabilities of network browsers, such as Mosaic and Netscape Navigator, to access and utilize electronic mail messages. Implementation and use of the present invention will subsequently be described in greater detail.

Before providing a more detailed description of the present invention, a brief overview of an environment in which the present invention operates will be provided. Furthermore, in the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. Details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numerals through the several views.

FIG. 2 illustrates a communication network based on a client-server model typically utilized in the Internet. The subsequent discussion and description of FIG. 2 are provided to illustrate the Internet environment utilized by the present invention.

Conceptually, the Internet comprises a large network of "servers" 210 that are accessible by "clients" 212. Each of the plurality of clients 212 is typically a user of a personal computer. Clients 212 access the Internet through some private Internet access provider 214 (such as Internet America™) or an on-line service provider 216 (such as America On-Line™, AT&T WorldNet™, and the like). Each of clients 212 may run on a "browser," which is a known software tool used to access the servers (210) via the access providers (214 and 216). Each server 210 selectively operates a "web site" that supports files in the form of documents and pages. A network path to a server is identified by a uniform resource locator (URL) having a known syntax for defining a network connection.

As previously mentioned, the World Wide Web is a collection of servers on the Internet that utilizes Hypertext Transfer Protocol (HTTP). HTTP is a known application protocol that provides users access to files using a standard page description language known as Hypertext Markup Language (HTML). It should be noted that the files may be in different formats, such as text, graphics, images, sound, video, and the like. HTML provides basic document formatting and allows the developer to specify "links" to other servers or files. Use of an HTML-compliant browser involves specification of a link via the URL. Upon such specification, one of the clients 212 may make TCP/IP request to one of plurality of servers 210 identified in the link and receive a web page (specifically, a document formatted according to HTML) in return.

FIG. 3 illustrates a data processor 300 that may be utilized to implement a "client" (212) that executes the methodology of the present invention. Data processing system 300 comprises a central processing unit (CPU) 310, such as a microprocessor. CPU 310 is coupled to various other components via System bus 312. Read-only memory (ROM) 316 is coupled to the System bus 312 and includes a basic input/output system (BIOS) that controls certain basic functions of the data processing system 300. Random access memory (RAM) 314, I/O adapter 318, and communications adapter 334 are also coupled to System bus 312. I/O 318 may be a small computer system interface (SCSI) adapter that communicates with a disk storage device 320. Communications adapter 334 interconnects bus 312 with an outside network enabling the data processing system to communicate with other such systems. Input/output devices are also connected to System bus 312 via user interface adapter 322 and display adapter 336. Keyboard 324, trackball 332, mouse 326, and speaker 328 are all interconnected to bus 312 via user interface adapter 322. Display monitor 338 is coupled to system bus 312 by display adapter 336. In this manner, a user is capable of inputting to the system through keyboard 324, trackball 332, or mouse 326, and receiving output from the system via speaker 328 and display 338.

When the code provided above is executed, the following index is illustrated on a display device provided to an external user:

| Index of Saved Mail | | |
|---|---|---|
| Subject | From | Date |
| Patent Application Status | Robert Tycast | Nov. 1, 1997 |
| More Info | Robert Tycast | Nov. 2, 1997 |
| White Paper on Patents | | |
| Abstract | Robert Tycast | Nov. 3, 1997 |
| Table of Contents | | |
| Chapter 1 - Getting Started | | |
| Chapter 2 - Getting Going | | |
| Chapter 3 - Keep Going | | |
| Chapter 4 - Don't Stop Now | | |
| Chapter 5 - Almost Finished | | |
| Chapter 6 - Finishing Up | | |
| Appendix A | | |
| Glossary | | |
| Index | | |
| Patent Addendum | Robert Tycast | Nov. 4, 1997 |
| REPLY: Patent Addendum | Robert Tycast | Nov. 4, 1997 |

CPU 310 of data processing system 300 may be used to execute a parser software function 350 or the parser may be implemented in a separate circuit device. It should be noted that parsers are used very frequently in computer programming and may be generally defined as a software program or subsystem of a program that scans an input stream in order to identify elements needed for a next phase of the program's processing.

One example of a parser would be a command string processor. To provide a more detailed description of a parser, consider that an external user has typed the following at a DOS prompt:

DIR D:\MYDATA/P.

The parser would take this input and provide the following to a next phase or subsystem of the executing program:

Command="DIR"

Parameter="D:\MYDATA"

Options="P."

During a next phase, a program may be invoked to implement the "DIR" command. This program will then be given the remaining data from the parser (i.e. the parameter and options) that would enable the program to scan the directory named "MYDATA" on the drive known as "D:," pausing whenever a full page of information had been displayed (the "/P" option). Additionally, an operating system such as AIX ("AIX" is a trademark of IBM Corporation) is used to coordinate the functions of the various components illustrated in FIG. 3.

During operation, CPU 310 also executes the software associated with browser 352 to perform a variety of functions, including accessing and searching for electronic mail messages in accordance with one embodiment to the present invention which will subsequently be described in greater detail herein. As previously described, a browser is a common name given to a class of computer programs used to access documents on the World Wide Web. In the present invention, browser 352 communicates with programs, referred to as HTTP server, an HTTP daemon, or a Web server that manage WWW documents via the HTTP protocol. A browser receives documents that it requests as an HTTP stream, extracts the HTML text included in the HTTP stream, interprets the HTML protocol, and displays the result on a local display device.

Furthermore, in receiving information via the network, CPU 310 relies on certain protocols to provide the proper data to parser 350 and browser 352. It should be noted that a protocol is a set of rules defining a method by which two entities communicate in a strict and formal manner. In the present invention, software protocols include TCP/IP for reliable packet delivery over the network, HTTP for communication between browser 352 and Web servers, and multiple protocols of a proprietary nature such as the one used by Lotus Notes™.

Some embodiments of the invention include implementations as a computer system program to execute the method or methods described herein, and as a computer program product. According to the computer system implementation, sets of instructions for executing the method or methods are resident in RAM 314 of one or more computer systems configured generally as described above. Until required by the computer system, the set of instructions may be stored as a computer program product in another computer memory. For example, in disk drive 320 (which may include a removable memory such as an optical disk or floppy disk for eventual use in disk drive 320).

Further, the computer program product can also be stored at another computer and transmitted in a computer readable medium when desired to the user's work station by a network or by an external network such as the Internet. One skilled in the art would appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting, or other terms that could be associated with the human operator. However, at least for a number of the operations described herein which form a part of the present invention, no action by a human operator is desirable. The operations described are, in large part, machine operations processing electrical signals to generate other electrical signals.

Figure 4:
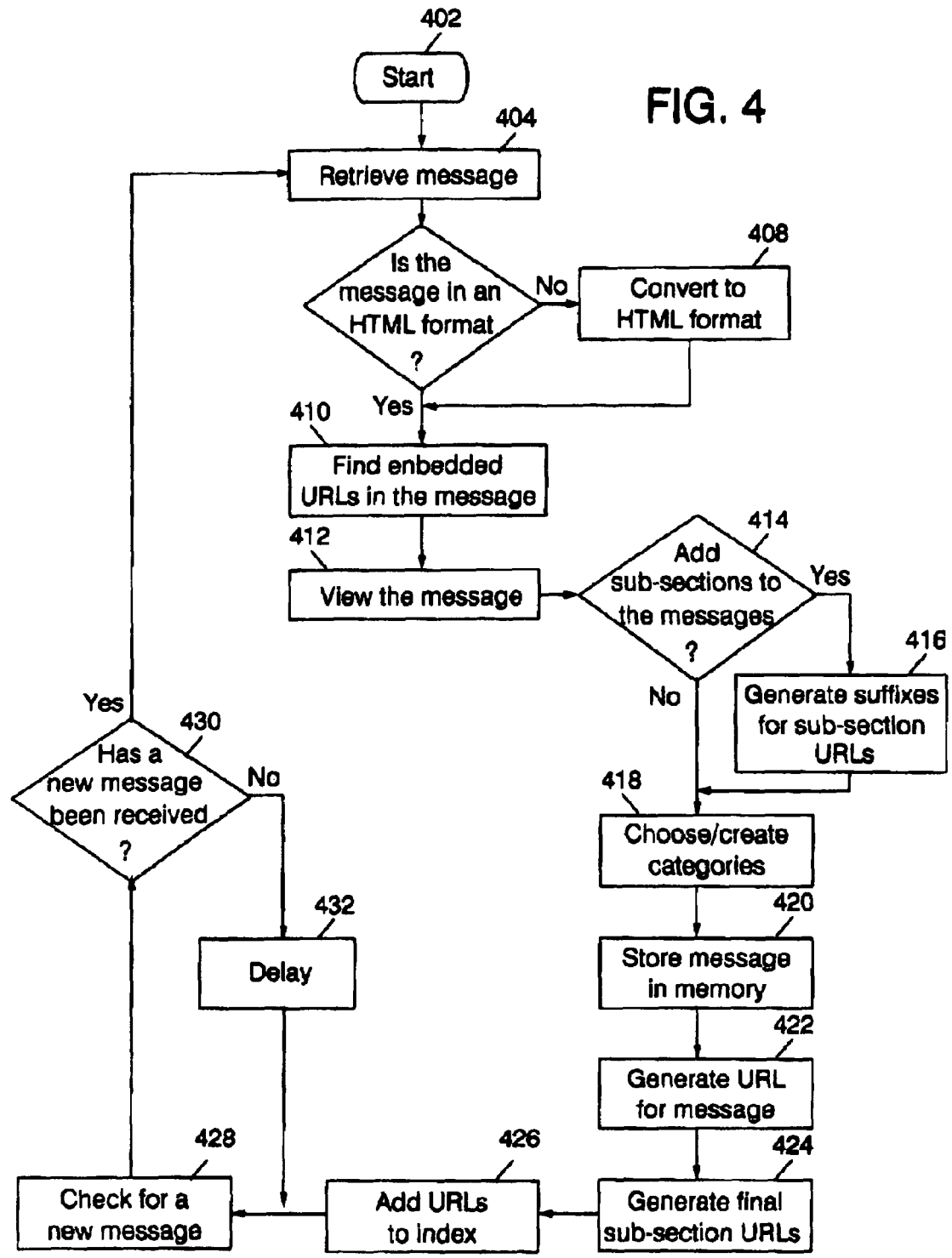
FIG. 4 illustrates, in flowchart form, a method implemented to archive, store, and retrieve electronic mail messages in accordance with one embodiment of the present invention.

A description of operation of the present invention will now be provided in greater detail. Refer now to FIG. 4 for a flowchart that illustrates a methodology implemented in one embodiment of the present invention for receiving, storing, and archiving electronic mail messages. Each of the steps executed in FIG. 4 is performed under the control of one of the components of data processing system 300 of FIG. 3.

A methodology for retrieving, storing, and archiving an electronic mail message is initiated in a step 402 under control of CPU 310. Subsequently, in step 404, a message is retrieved via communications adapter 334 from a source on the Internet. It should be noted that the Internet is generically referred to as "Network" in FIG. 3.

In a step 406, CPU 310 determines whether the retrieved message is in an HTML format by reviewing a message header or the content of the message. CPU 310 performs this determination by performing a parsing operation in which incoming messages are scanned to determine if the message is an HTML document using parser 350. To implement the parsing technique of step 406, a translator program (354) executed by CPU 310 examines a header or markers in the data content of the mail to determine the form of the mail. It should be noted that conventional Internet e-mail utilizes a field and the present invention analyzes the field to detect the presence or absence of a message in the HTML format. If the message is not in an HTML format, CPU 310 converts the message to the HTML format in a step 408. Examples of such conversion operations are provided in Appendix A.

It should be noted that applications such as Netscape Mail™ allow users to send electronic mail messages in an HTML format. In Netscape Messenger, an application is implemented for communicating electronic mail messages over intranet and the Internet. This application is integrated with Network Composer™ to allow users to create electronic mail messages that behave as web pages, complete with graphics, images, and even Java applets. The editing allowed by Netscape Composer allows the Netscape Messenger application to send electronic mail messages that look and behave like web pages. However, these prior art applications fail to provide any significant organizational capabilities in the manner proposed by the present invention.

Additionally, a Lotus Domino™ application provides such conversion technology. When a user requests a document that is not in an HTML format in the Lotus Domino™ application, the Lotus Domino™ application converts the document to an HTML format to allow the user to browse it.

After the message is either received in an HTML format or converted to an HTML format, CPU 310 accesses parser 350 to parse the received message to find any embedded URLs in a step 410. CPU 310 is able to determine the presence of URLs by parsing the retrieved message to detect the presence of the prefix "http." Alternate prefixes that indicate the presence of URL's include "ftp" and "gopher." After parsing the embedded URLs in the message, CPU 310 provides data and control signals to enable the message to be displayed in an appropriate manner in a step 412.

The appropriate manner for providing the message is dependent upon a type of message to be provided (i.e. electronic mail, digital page, short message from cellular phone). For example, CPU 310 may provide the appropriate data and control signals via system bus 312 to display adapter 336. Display adapter 336 will then enable display device 338 to display the text of the electronic mail message to the user. Alternatively, CPU 310 could provide the appropriate data and control signals to a paging adapter, a cellular telephone adapter, and other such devices not illustrated in FIG. 3, but well-known to those with skill in the relevant art. Upon receipt of the data and control signals, the paging adapter may emit a notification sound and display a telephone number associated with the message. Likewise, the cellular telephone may emit a notification sound and display a telephone number or a message, in accordance with a short message service.

After viewing the message in a step 412, CPU 310 executes step 414 to selectively add subsections to the messages that are being viewed. As utilized herein, subsections function in a similar manner to "bookmarks" or document fragment identifiers. Subsections may be "added" to the messages through automatic and non-automatic methodologies. When adding a subsection to the message in a non-automatic manner, a user may simply add a "hyperlink" to appropriate locations within the message.

To add a hyperlink, the subsection is simply indicated, through the use of mouse 326 or another user input provided to user interface adapter 322, and subsequently transferred to CPU 310. It should be noted that the subsection is indicated by highlighting the hyperlink, pointing to the hyperlink text in the displayed message, or by another well-known accessing methodology. Alternatively, the manual operation of selecting a subsection and then indicating that a hyperlink should be inserted therein may be automated such that subsections are added immediately upon identification by an external user. In an alternate embodiment of the present invention, it should be noted that the subsection may be automatically detected in accordance with predefined criteria. For example, a subsection may be automatically inserted upon the detection of certain information in a "header" section of an HTML document. When the user indicates that a subsection should be inserted, CPU 310 provides the data and control signals necessary to insert link identifiers within the HTML code associated with the electronic message. For example, links associated with subsection 1 and subsection 2 are respectively designated by:

⟨a name="subsection1"⟩ . . . ⟨a⟩; and

⟨a name="subsection2"⟩ . . . ⟨a⟩.

If subsections are added to the messages, CPU 310 generates suffixes for each of the subsections to be used later to complete URLs corresponding to each of the subsections. The suffixes are generated in a step 416 of FIG. 4. It should be noted that names associated with the subsections may be chosen by a user or programmer, and are not limited to being "subsection" as provided for in the example herein.

After any subsections desired by the user are added to the messages, the user may choose or create categories for storing the received messages in a step 418. Categories may include topics or identifiers selected by an external user for organizational purposes. Should a user receive a message corresponding to a new topic, the user may choose to create a category using well-known techniques that will not be described in greater detail herein. After determining a category in which the message should be placed or creating a new category in which to place the message, the message is stored in a memory in a step 420. That memory may be a local memory to data processing system 300 or a memory located on a remote server that is identified as memory corresponding to the user. Subsequently, a web site that is being accessed by the user for generating the web pages corresponding to the electronic mail messages generates a URL corresponding to that message.

The URL will be generated in accordance with a standard protocol that is explained below. Assume that a first message, MSG 1, is transferred to an Internet server (214, 216) referred to as "MYSERV." Within the server, mail corresponding to the user is stored in a location referred to as "MYMAIL." When MSG 1 is transferred to MYSERV via a local or network connection, MYSERV places MSG 1 data into the MYMAIL storage location. A resulting URL generated by the server is:

http://MYSERV/MYMAIL/MSG1

Next, in a step 424, the subsection URLs are completed. In this case, the suffixes previously generated in step 416 are added to the URL generated in step 422. Therefore, for a "subsection 1," a corresponding final subsection URL is generated having the form:

http://MYSERV/MYMAIL/MSG1/#subsection1

Additionally, should MSG 1 have a second subsection, a corresponding subsection URL would be:

http://MYSERV/MYMAIL/MSG1/#subsection2

The server (MYSERV) automatically generates URLs for the subsections based on the URL for the stored message (MSG 1).

Next, in a step 426, URLs are added to an index stored within a memory that may be accessed by CPU 310 and displayed to an external user. In a step 428, CPU 310 determines whether a new message has been received. If a new message has been received (step 430), the message is retrieved and a program flow returns to step 404. However, if a new message has not been received, a delay step 432 is executed and a program flow returns to step 428.

FIG. 5 illustrates an example of the indexes created and displayed on user's display devices in accordance with one embodiment of the present invention. In a first index, Robert's Index, 502, messages are divided into two topics. The topics are collectively referred to as "Messages Robert's Topic 1" and "Messages Robert's Topic 2." Within the first topic (Topic 1), four messages are indexed. Additionally, note that Message 3 has three subsections identified therein. Generation of the subsections has previously been described in greater detail.

Additionally, refer to the second topic illustrated in Index 502. In this topic, a Message 5 is indexed. Furthermore, Message 5 identifies "N" links to other web pages or documents. By detecting embedded URLs within a message, these links may be created to allow an external user of Index 502 to search other documents available via a communication network.

Additionally, refer to Beth's Index 504. This is the second index created for a second external user in one embodiment of the present invention. However, it should be noted that a single user may have more than one index, depending on a user's needs or wishes. Within Beth's Index 504, certain messages about "Robert's Topic 2" are stored. This index then refers to the URL corresponding to "Messages Robert's Topic 2" in Index 502. Additionally, Beth's Index 504 refers to individual messages in topics (see 508) and individual sections within messages under a certain topic (510).

Each of the indexes described above and illustrated in FIG. 5 may then be utilized in a flexible manner by a user to access and search messages using readily known Internet searching techniques and through the use of an index interface that readily shows the messages, their subsections, and corresponding links in intuitive and user-friendly manner. Thus, by converting the electronic messages received by a user to HTML documents, or web pages, the present invention implements a data processing system and methodology that allows users to generate a complex indexing scheme that adequately meets all of the needs of a user, without requiring the user to be tied to a specific protocol. Indeed, because the messages may be implemented as a web page, new applications for browsing those web pages, as well as new languages provided for the Internet, may be easily applied to existing organizations.

An example of a message that is indexed in accordance with the present invention will subsequently be described. In the example, a step-by-step analysis of the receipt of the message and its storage within a user's system will be described.

---

Assume that the following e-mail message is received:
To:         Beth
From:       Robert
Subject:    WhitePaper on Patents
Hi,
Here's the draft of the book on patents.
Hope you enjoy it. ;-)
Robert
************************

---

Writing a Patent Application

Abstract:
Writing a patent application can be a time-consuming, but rewarding activity. Decomposing the tasks valuable tool to manage the work
Table of Contents
Abstract
Table of Contents
Chapter 1—Getting Started
Chapter 2—Getting Going
Chapter 3—Keep Going
Chapter 4—Don't Stop Now
Chapter 5—Almost Finished
Chapter 6—Finishing Up
Appendix A—Talking to Lawyers
Glossary
Index
Chapter 1—Getting Started
Best to start at the beginning.
Chapter 2—Getting Going
Follow the yellow-brick road.
Chapter 3—Keep Going
Repeat: Follow the yellow-brick road.
Chapter 4—Don't Stop Now
Follow, follow, follow, follow, follow the yellow-brick road!
Chapter 5—Almost Finished
We're off to see the wizard, the wonderful lizard of OZ.
Chapter 6—Finishing Up
Put up your feet, grab a coffee, and curl up with a good book.
Appendix A—Talking to Lawyers
Is not so hard. There are a few things to keep in mind though:
1. Get to the point. Tempus fugit
2. Avoid promises you can't keep
3. Don't forget the Esq. at the end of the name when addressing correspondence
4. And by all means remember: lawyer jokes are in poor form. They will probably get you off to a bad start and may ruin your chances at the patent office.
Index
Apple
Application
Banana
Book
Chicken
Lizard
Wizard
The message is then converted to an HTML document (see Appendix A).
In the following example, differences between the HTML document and the e-mail will be underlined. The HTML document has the form:

---

```
<!DOCTYPE HTML PUBLIC "-//W3C//DTD HTML 3.2 Final//EN">
<HTML>
<HEAD>
<TITLE>WhitePaper on Patents</TITLE>
<BODY>
<ADDRESS>
To: <A HREF="mailto:bapperle@winstead.com">Beth</A><BR>
From: <A HREF="mailto.tycast@us.ibm.com">Robert<A><BR>
Subj: WhitePaper on Patents<BR>
</ADDRESS>
<PRE>
Hi,
Here's the draft of the book on patents.
Hope you enjoy it. ;-)
Robert
******************************
```

---

Writing a Patent Application

Abstract:
Writing a patent application can be a time-consuming, but rewarding activity. Decomposing the tasks into sub-tasks can be a valuable tool to manage the work.
Table of Contents . . .
The text is the same until the end, at which point the following HTML code is inserted:
</PRE>
</BODY>
<HTML>
Subsequently, the server generates a URL for this message having the form:
http://www.mailserver.bethscompany.com/mailboxes/beth/msg0001

The URL is then saved in main memory of the data processing system of the present invention for use in later steps. Assume that the message is then displayed to an external user. If the user has decided to invoke an automatic function to add subsections to the message, the reader selects an "Auto Index" function from an option menu in one embodiment of the present invention. The user's system then scans the message looking for recognizable functions to index. An indexed document having the following form results. The differences between the auto-indexed version and the prior version are underlined herein to emphasize the differences in the two documents.

```
<!DOCTYPE HTML PUBLIC "-//W3C//DTD HTML 3.2 Final//EN">
<HTML>
<HEAD>
<TITLE>WhitePaper on Patents<TITLE>
</HEAD>
<BODY>
<ADDRESS>
To: <A HREF- "mailto:bapperle@winstead.com">Beth</A><BR>
From: <A HREF="mailto.tycast@us.ibm.com">Robert<A><BR>
Subj: WhitePaper on Patents<BR>
</ADDRESS>
<PRE>
Hi,
Here's the draft of the book on patents.
Hope you enjoy it. ;-)
Robert
*******************************
```

Writing a Patent Application

Abstract:<a name=<u>"Abstract"></a></u>

Writing a patent application can be a time-consuming, but rewarding activity. Decomposing the tasks into subtasks can be a valuable tool to manage the work.

Table of Contents<a name=<u>"TableofContents"></a></u>
Abstract
Table of Contents
Chapter 1—Getting Started
Chapter 2—Getting Going
Chapter 3—Keep Going
Chapter 4—Don't Stop Now
Chapter 5—Almost Finished
Chapter 6—Finishing Up
Appendix A—Working with a Patent Attorney
1.) Get to the point. Tempus fugit
2.) Avoid promises you can't keep
3.) Don't forget the Esq. at the end of the name when addressing correspondence
4.) And by all means remember: lawyer jokes are in poor form. They will probably get you off to a bad start and may ruin your chances at the patent office.

Glossary<a name="Glossary"></a>

Apple
Banana
Chicken
Cow
Dog
  Index<a name="Index"></a>

Apple
  Application

-continued

Banana
  Book
  Chicken
  Lizard
  Wizard
</PRE>
</BODY>
<HTML>

At this point the user's system has scanned the message and identified and "tagged" appropriate items, including chapters, appendices, and the like. Next, assume the user wants to mark some subsections of their own. The user would then select a portion of the message text with the mouse and "click." The user's system responds with the following dialog, assuming that the reader selected item #4 in Appendix A and supplied the following answers:

Subsection name:
Patent_Joke
Categories:
Joke-Lawyers
Joke-Patents

The corresponding portion of the HTML message (HTML) is modified to have the following form. Note that the differences between the previous code and the following code is underlined.

Is not so hard. There are a few things to keep in mind though:
  1) Get to the point. Tempus fugit
  2) Avoid promises you can't keep
  3) Don't forget the Esq. at the end of the name when addressing correspondence
  4) And by all means remember: lawyer jokes are in poor form. They will probably get you off to a bad start and may ruin your chances at the patent office.<a name="Patent_Joke"></a>

Glossary <a name="Glossary"></a>

Apple
Banana
Chicken
Cow
Dog
  Index<a name="Index"></a>

Apple
  Application
  Banana
  Book
  Chicken
  Lizard
  Wizard
</PRE>

Glossary
Index
Chapter 1—Getting Started <u><aname="Chapter1—GettingStarted"></a></u>
Best to start at the beginning.
Chapter 2—Getting Going<a name=<u>"Chapter2—GettingGoing"></a></u>
Follow the yellow-brick road.
Chapter 3—Keep Going<a name=<u>"Chapter3—KeepGoing"></a></u>
Repeat: Follow the yellow-brick road.

Chapter 4—Don't Stop Now<a name="Chapter4—Don'tStopNow"></a>

Follow, follow, follow, follow, follow the yellow-brick road!

Chapter 5—Almost Finished<a name="Chapter5—AlmostFinished"></a>

We're off to see the wizard, the wonderful wizard of OZ.

Chapter 6—Finishing Up<a name="Chapter6—FinishingUp"></a>

Put up your feet, grab a coffee, and curl up with a good book.

Appendix A—Working with a Patent Attorney<a name="AppendixA—WorkingwithaPatentAttorney"></a>

Is not so hard. There are a few things to keep in mind though:

</BODY>

<HTML>

Finally, assume that the user decides to save this message. To perform such a function, the user selects the "save" function from a menu implemented by an operating system and the user's system would take the following steps:

1. The message is saved in a file named "msg0001.html" in the storage space indicated by URL http://www.mailserver.bethscompany.com/mailboxes/beth/;
2. The URL, "http://www.mailserver.bethscompany.com/mailboxes/beth/msg0001.htm" is added to the file named "index.html" in the same storage space as in step 1;
3. URL's for the subsections are added to index.html directly following the URL in step 2.
4. A URL in the form of "http://www.mailserver.bethscompany.com/mailboxes/beth/msg0001.html/#Patent_Joke" is stored in the file named "index.html" in the storage space indicated by: "http://www.mailserver.bethscompany.com/mailboxes/beth/jokes/lawyers"
5. A URL in the form of "http://www.mailserver.bethscompany.com/mailboxes/beth/msg0001.html/#Patent_Joke" is stored in the file named "index.html" in the storage space indicated by: "http://www.mailserver.bethscompany.com/mailboxes/beth/jokes/patents"
6. The system waits for the user's next request.

At this point, the indices are designated in a manner illustrated below.

Main Index: http://www.mailserver.bethscompany.com/mailboxes/beth/index.html

```
<!DOCTYPE HTML PUBLIC "-//W3C//DTD HTML 3.2 Final//EN">
<HTML>
<HEAD>
<TITLE>Saved Mail</TITLE>
</HEAD>
<BODY>
<H1>Index of Saved Mail</H1>
<ul>
    <li><a href="msg00001.html">Patent Application Status</a>
    <li><a href="msg00002.html">More Info</a>
    <li><a href="msg0001.html">WhitePaper on Patents</a>
    <ul>
        <li><a href="msg0001.html/#Abstract">Abstract</a>
        <li><a href="msg0001.html/#Table of Contents">Table of Contents</a>
        <li><a href="msg0001.html/#Chapter 1 - Getting Started">Chapter 1 - Getting Started</a>
        <li><a href="msg0001.html/#Chapter 2 - Getting Going">Chapter 2 - Getting Going</a>
        <li><a href="msg0001.html/#Chapter 3 - Keep Going">Chapter 3 - Keep Going</a>
        <li><a href="msg0001.html/#Chapter 4 - Don't Stop Now">Chapter 4 - Don't Stop Now</a>
        <li><a href="msg0001.html/#Chapter 5 - Almost Finished">Chapter 5 - Almost Finished</a>
        <li><a href="msg0001.html/#Chapter 6 - Finishing Up">Chapter 6 - Finishing Up</a>
        <li><a href="msg0001.html/#Appendix A">Appendix A</a>
        <li><a href="msg0001.html/#Glossary">Glossary</a>
        <li><a href="msg0001.html/#Index">Index</a>
</ul>
</BODY>
</HTML>
```

When this code is executed, an index appears on a display device in a following format:

Index of Saved Mail

Patent Application Status

More Info

WhitePaper on Patents

Abstract

Table of Contents

Chapter 1—Getting Started

Chapter 2—Getting Going

Chapter 3—Keep Going

Chapter 4—Don't Stop Now

Chapter 5—Almost Finished

Chapter 6—Finishing Up

Appendix A

Glossary

Index

After the reader saves two additional messages, the index is coded in a following format:

```
<!DOCTYPE HTML PUBLIC "-//W3C//DTD HTML 3.2 Final//EN">
<HTML>
<HEAD>
<TITLE>Saved Mail</TITLE>
</HEAD>
<BODY>
<H1>Index of Saved Mail</H1>
<ul>
    <li><a href="msg00001.html">Patent Application Status</a>
    <li><a href="msg00002.html">More Info</a>
    <li><a href="msg0001.html">WhitePaper on Patents</a>
    <ul>
        <li><a href="msg0001.html/#Abstract">Abstract</a>
        <li><a href="msg0001.html/#Table of Contents">Table of Contents</a>
        <li><a href="msg0001.html/#Chapter 1 - Getting Started">Chapter 1 -
            Getting Started</a>
        <li><a href="msg0001.html/#Chapter 2 - Getting Going">Chapter 2 -
            Getting Going</a>
        <li><a href="msg0001.html/#Chapter 3 - Keep Going">Chapter 3 - Keep
            Going</a>
        <li><a href="msg0001.html/#Chapter 4 - Don't Stop Now">Chapter 4 -
            Don't Stop Now</a>
            <li><a href="msg0001.html/#Chapter 5 - Almost Finished">Chapter 5 -
                Almost Finished</a>
        <li><a href=="msg0001.html/#Chapter 6 - Finishing Up">Chapter 6 -
            Finishing Up</a>
        <li><a href="msg0001.html/#Appendix A">Appendix A</a>
        <li><a href="msg0001.html/#Glossary">Glossary</a>
        <li><a href="msg0001.html/#Index">Index</a>
    </ul>
    <li><a href="msg0002.html">Patent Addendum</a>
    <li><a href="msg0003.html">REPLY: Patent Addendum</a>
</BODY>
</HTML>
```

When this code is executed, an index is displayed on a display device of the user in a following format:

Index of Saved Mail
Patent Application Status From: Robert Tycast Date: Nov. 1, 1997
More Info From: Robert Tycast Date: Nov. 2, 1997
White Paper on Patents From: Robert Tycast Date: Nov. 3, 1997
  Abstract
  Table of Contents
  Chapter 1—Getting Started
  Chapter 2—Getting Going
  Chapter 3—Keep Going
  Chapter 4—Don't Stop Now
  Chapter 5—Almost Finished
  Chapter 6—Finishing Up
  Appendix A
  Glossary
  Index
Patent Addendum
REPLY: Patent Addendum Please note that a manner in which the index is displayed is very flexible and powerful. The examples provided above are in order to not unduly obscure the present invention. For example, an alternate manner in which information (date and sender) could be added to the index is illustrated in the code provided below:

```
<!DOCTYPE HTML PUBLIC "-//W3C//DTD HTML 3.2 Final//EN">
<HTML>
<HEAD>
<TITLE>Saved Mail</TITLE>
</HEAD>
<BODY>
<H1>Index of Saved Mail</H1>
<table border cellspacing=0>
    <tr>
        <th>Subject</th>
        <th>From</th>
        <th>Date</th>
    </tr>
    <tr>
        <td><li><a href="msg00001.html">Patent Application Status</a></td><td><A
            HREF="mailto:tycast@us.ibm.com">Robert Tycast</A></td><td>11/01/97</td>
    </tr>
    <tr>
        <td><li><a href="msg00002.html">More Info</a><td><td><A
            HREF="mailto:tycast@us.ibm.com">Robert Tycast</A></td><td>11/02/97</td>
```

-continued

```
    </tr>
    <tr>
        <td><li><a href="msg0001.html">White Paper on Patents</a>
        <ul>
            <li><a href="msg0001.html/#Abstract">Abstract</a>
            <li><a href="msg0001.html/#Table of Contents">Table of Contents</a>
            <li><a href="msg0001.html/#Chapter 1 - Getting Started">Chapter 1 -
                Getting Started</a>
            <li><a href="msg0001.html/#Chapter 2 - Getting Going">Chapter 2 -
                Getting Going</a>
            <li><a href="msg0001.html/#Chapter 3 - Keep Going">Chapter 3 - Keep
                Going</a>
            <li><a href="msg0001.html/#Chapter 4 - Don't Stop Now">Chapter 4 -
                Don't Stop Now</a>
            <li><a href="msg0001.html/#Chapter 5 - Almost Finished">Chapter 5 -
                Almost Finished</a>
            <li><a href="msg0001.html/#Chapter 6 - Finishing Up">Chapter 6 -
                Finishing Up</a>
            <li><a href="msg0001.html/#Appendix A">Appendix A</a>
            <li><a href="msg0001.html/#Glossary">Glossary</a>
            <li><a href="msg0001.html/#Index">Index</a>
        </ul>
    </td><td><A HREF="mailto:tycast@us.ibm.com">Robert Tycast</A></td><td>
        11/03/97</td>
    </tr>
    <tr>
    <td><li><a href="msg0002.html">Patent Addendum </a></td><td><A
        HREF="mailto:tycast@us.ibm.com">Robert Tycast</A></td><td>11/04/97</td>
    </tr>
    <tr>
    <td><li><a href="msg0003.html">REPLY: Patent Addendum</a></td><td><A
        HREF="mailto:tycast@us.ibm.com">Robert Tycast<A></td><td>11/04/97</td>
    </tr>
    </table>
    </BODY>
</HTML>
```

Additionally, note that the reader can access any of the messages or subsections by simply clicking on the appropriate text. A reply message can be sent by clicking on the name in the "From:" field.

The indexes for other archives are formed similarly. For example, in the previously described example, where some "Joke" information was saved, the file in which the information was saved would be indicated by the URL:

"http://www.mailserver.bethscompany.com/mailboxes/bethapperley/jokes/index.html"

The code at that section would subsequently have the following format:

```
<!DOCTYPE HTML PUBLIC "-//W3C//DTD HTML 3.2 Final//EN">
<HTML>
<HEAD>
<TITLE>Jokes</TITLE>
</HEAD>
<BODY>
```

-continued

```
<H1>Index of Jokes</H1>
<ul>
<li><a href="lawyers/index.html">Lawyers</a>
<li><a href="patents/index.html">Patents</a>
</ul>
</BODY>
</HTML>
```

In this code, note that the reader can click on either "Lawyers" or "Patents" to view the contents of that archive. Furthermore, assume the reader decides to click on the "Lawyers" text. The reader would access the file indicated by the URL:

"http://www.mailserver.bethscompany.com/mailboxes/beth/jokes/lawyers/index.html"

When that index was accessed, the following code would be retrieved:

```
<!DOCTYPE HTML PUBLIC "-//W3C//DTD HTML 3.2 Final//EN">
<HTML>
<HEAD>
<TITLE>Jokes/Lawyers</TITLE>
</HEAD>
<BODY>
<H1>Index of Jokes/Lawyers</H1>
<ul>
<li><a href="oldjoke1.html">Previously saved Joke#1</a>
<li><a
```

-continued

```
href="http://www.mailserver.bethscompany.com/mailboxes/beth/msg0001.html/
     #Patent_Joke">Patent_Joke</a>
</ul>
   </BODY>
   </HTML>
```

Note that this is an example of where a complete note (Joke#1) is stored in the storage space labelled "Lawyers," but the "Patent_Joke," which is a part of the "WhitePaper on Patents," is not stored therein. Instead, the URL used to access the storage space points back to a memory fragment labeled in the original message. Such a situation would be nearly identical for the folder called "Patents." More detail will not be provided herein. However, it should be noted that in the case of this archive, the same fragment in the original message called "Patent_Joke" is shared.

APPENDIX A

OTHER EXAMPLES OF OPERATION

Example A

Assume, in the following example, that an e-mail message has been received by a user. As previously explained, an e-mail message includes alphanumeric characters. If the message is actually encoded as HTML, then the message can be readily detected by scanning the first line that specifically starts with a <!DOCTYPE> declaration followed by an HMTL element containing a HEAD and then a BODY ELEMENT. An example of such an e-mail message is illustrated below:

```
<!DOCTYPE HTML PUBLIC"-//W3C//DTD HTML 3.2 Final//EN">
<HTML>
<HEAD>
<TITLE>Sample HTML Document</TITLE>
. . . other head elements
</HEAD>
<BODY>
. . . document body
</BODY>
</HTML>"
```

Furthermore, if the message is not written in HTML, the message may be converted by wrapping the alphanumeric content with the necessary subject fields inserted properly. For example, assume that the following e-mail message is sent:

```
To:      Beth
From:    Robert
Subject: Information
Hi,
I have some more information for you.
Regards,
Robert
```

To wrap the alphanumeric content with the necessary fields, the following wrapper is added to the content of the message by CPU 310:

```
<!DOCTYPE HTML PUBLIC "-//W3C//DTD HTML 3.2 Final//EN">
<HTML>
<HEAD>
</HEAD>
<BODY>
    Hi,
    I have some more information for you.
    Regards,
    Robert
</BODY>
</HTML>
```

Next, to preserve the format of the message, the body is surrounded with the <PRE> tag. This is illustrated below:

```
<!DOCTYPE HTML PUBLIC ". . . //W3C//DTD HTML 3.2 Final//EN">
<HTML>
<HEAD>
</HEAD>
<BODY>
<PRE>
    Hi,
    I have some more information for you.
    Regards,
    Robert
</PRE>
</BODY>
</HTML>
```

Subsequently, an address section is created using the "TO" and "FROM"

APPENDIX A-continued

OTHER EXAMPLES OF OPERATION fields in the original message. This creation is illustrated below:

```
<!DOCTYPE HTML PUBLIC "-//W3C//DTD HTML 3.2 Final//EN">
<HTML>
<HEAD>
</HEAD>
<BODY>
<ADDRESS>
To: <A HREF="mailto:bapperle@winstead.com">Beth Apperley</A><BR>
From: <A HREF="mailto:tycast@us.ibm.com">Robert Tycast</A><BR>
</ADDRESS>
<PRE>
    Hi,
        I have some more information for you.
        Regards,
        Robert
</PRE>
</BODY>
</HTML>
```

Furthermore, if a subject was specified in the original message, it would be added to the address section:

```
<!DOCTYPE HTML PUBLIC"-//W3C//DTD HTML 3.2 Final//EN">
<HTML>
<HEAD>
<TITLE>Patent Application</TITLE>
</HEAD>
<BODY>
<ADDRESS>
To: <A HREF="mailto:bapperle@winstead.com">Beth Apperley</A><BR>
From: <A HREF="mailto:tycast@us.ibm.com">Robert Tycast</A><BR>
Subj: Patent Application<BR>
</ADDRESS>
<PRE>
Hi,
    I have some more information for you concerning the invention.
    Regards,
    Robert
</PRE>
</BODY>
</HTML>
```

Example B

It should be noted that there are many ways to convert a document to HTML, and those methods are well-known to those with skill in the art. Furthermore, while the foregoing describes the steps that may be used to convert a document to HTML for purposes of the present invention, the following example will provide a method for receiving and filing a document with enclosures. Note that in the following example, a mail message which has been created and has two enclosures: a jpeg image and a gif.

The message as received by the CPU 310 is:

```
MIME-Version: 1.0
To: Beth A
From: Robert T
Subject: Here are the Files!
Content-Type: multipart/mixed;
                    boundary-unique-boundary-1
--unique-boundary-1
    Content-type:text/plain; charset-US-ASCII
Beth,
Here are the two files that I'd like you to review. The first one is a jpeg,
the second is a gif.
Regards,
Robert
    --unique-boundary-1
    Content-Type: multipart/parallel;
        boundary=unique-boundary-2
    --unique-boundary-2
    Content-Type: image/jpeg
    Content-Transfer-Encoding: base64
    . . . base64-encoded image data goes here . . .
    --unique-boundary-2
    Content-Type: image/gif
    Content-Transfer-Encoding: base64
    . . . base64-encoded image data goes here . . .
    --unique-boundary-2--
    --unique-boundary-1
```

The first step in the conversion will be to extract the two files from the message. Refer to the files as image1.jpg and image2.gif. These files are

APPENDIX A-continued

OTHER EXAMPLES OF OPERATION physically stored with the converted message, though this is not a requirement.
Next, the body of the message is converted as in the previous example to provide:

```
<!DOCTYPE HTML PUBLIC "-//W3C//DTD HTML 3.2 Final//EN">
<HTML>
<HEAD>
<TITLE>Here are the Files!</TITLE>
</HEAD>
<BODY>
<ADDRESS>
To: <A HREF="mailto:bapperle@winstead.com">Beth Apperley</A><BR>
From: <A HREF="mailto:tycast@us.ibm.com">Robert Tycast</A><BR>
Subj: Here are the Files!<BR>
</ADDRESS>
<PRE>
Beth,
Here are the two files that I'd like for you to review. The first one is a
jpeg, the second is a gif.
Regards,
Robert
</PRE>
</BODY>
</HTML>
```

Hyperlinks are then added to the image files:

```
<!DOCTYPE HTML PUBLIC "-//W3C//DTD HTML 3.2 Final//EN">
<HTML>
<HEAD>
<TITLE>Here are the Files!</TITLE>
</HEAD>
<BODY>
<ADDRESS>
To: <A HREF="mailto:bapperle@winstead.com">Beth Apperley</A><BR>
From: <A HREF="mailto:tycast@us.ibm.com">Robert Tycast</A><BR>
Subj: Here are the Files!<BR>
</ADDRESS>
<PRE>
Beth,
    Here are the two files that I'd like you to review. The first one is a
    jpeg, the second is a gif.
Regards,
Robert
</PRE>
<IMG SRC="image1.jpg" ALT="image1.jpg">
<P>
<IMG SRC="image1.jpg" ALT="image2.gif">
</BODY>
</HTML>.
```

It should be noted that the descriptions provided herein are examples of an implementation of the present invention. Furthermore, it should be noted that many additional implementations may also be utilized to realize the present invention. For example, it is not required that the entire message be converted to an HTML format. Rather, the messages may be converted to a different format, such as ASCII or MIME in alternate embodiments of the present invention. Additionally, the indexes illustrated in FIG. 5 are provided as examples only and are not meant to limit a scope of the present invention or indicate a manner in which the indices should be configured.

Furthermore, note that the present invention may be used together with "plug-ins." Plug-in is a term coined by Netscape™ for programs using their published interface of extending the Netscape Navigator™ browser. Plug-ins have been primarily used to provide support for new data types such as a RealAudio™ plug-in which introduce streaming audio to the WWW. Other plug-ins have added enhanced functions to the browser. In the present invention, plug-ins may also be used, but are not required. For instance, when a message contains a MIME-type, a plug-in might be used to display data on a display device. Furthermore, a plug-in may be specifically developed to read messages archived using the present invention.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A computer-implemented method of organizing electronic messages comprising the steps of:
    parsing each message to determine a presence of one or more network communication link identifiers;
    adding a detected one of said one or more network communication links to a user accessible stored in the computer memory index; and
    adding one or more network communication links corresponding to one or more message subsections in said index, said one or more subsections being selectively generated in response to user input, said network communication links being operable for accessing a corresponding message information.

2. The method of claim 1 further comprising the steps of:
automatically generating said one or more subsections in response to a predetermined user input signal having a first value; and
manually generating said one or more subsections in response to said predetermined user input signal having a second value.

3. The method of claim 2 wherein said step of automatically generating said one or more subsections comprises the steps of:
scanning a selected message;
detecting a presence of one or more predetermined subsection identifiers; and
inserting a link corresponding to a detected one of said subsection identifiers in said selected message.

4. The method of claim 3 further comprising the step of generating a first one said one or more network communication links corresponding to one or more message subsections, wherein said first one of said network communication links includes said link corresponding to said detected one of said subsection identifiers.

5. The method of claim 3 wherein said link conforms to a preselected document formatting language.

6. The method of claim 5 further comprising the steps of:
determining if each message is in said preselected document formatting language; and
if a message is not in said preselected document formatting language, formatting said message in said document formatting language.

7. The method of claim 2 wherein said step of automatically generating said one or more subsections comprises the steps of:
selecting a portion of text of a selected message in response to user input;
displaying a user interface having a user alterable field operable for receiving subsection information;
inserting a subsection link in said portion of text corresponding to subsection information entered in said user alterable field.

8. The method of claim 7 further comprising the step of generating a first one said one or more network communication links corresponding to one or more message subsections, wherein said first one of said network communication links includes said subsection link.

9. The method of claim 7 wherein said subsection link conforms to a preselected document formatting language.

10. A data processing system for organizing electronic messages comprising:
circuitry operable for parsing each message to determine a presence of one or more network communication link identifiers;
circuitry operable for adding a detected one of said one or more network communication links to a user accessible index; and
circuitry operable for adding one or more network communication links corresponding to one or more message subsections in said index, said one or more subsections being selectively generated in response to user input said network communication links being operable for accessing a corresponding message information.

11. The data processing system of claim 10 further comprising:
circuitry operable for automatically generating said one or more subsections in response to a predetermined user input signal having a first value; and
circuitry operable for manually generating said one or more subsections in response to said predetermined user input signal having a second value.

12. The data processing system of claim 11 wherein said circuitry operable for automatically generating said one or more subsections comprises:
circuitry operable for scanning a selected message;
circuitry operable for detecting a presence of one or more predetermined subsection identifiers; and
circuitry operable for inserting a link corresponding to a detected one of said subsection identifiers in said selected message.

13. The data processing system of claim 12 further comprising circuitry operable for generating a first one said one or more network communication links corresponding to one or more message subsections, wherein said first one of said network communication links includes said link corresponding to said detected one of said subsection identifiers.

14. The data processing system of claim 12 wherein said link conforms to a preselected document formatting language.

15. The data processing system of claim 14 further comprising:
circuitry operable for determining if each message is in said preselected document formatting language; and
circuitry operable for, if a message is not in said preselected document formatting language, formatting said message in said document formatting language.

16. The data processing system of claim 11 wherein said circuitry operable for automatically generating said one or more subsections comprises:
circuitry operable for selecting a portion of text of a selected message in response to user input;
circuitry operable for displaying a user interface having a user alterable field operable for receiving subsection information;
circuitry operable for inserting a subsection link in said portion of text corresponding to subsection information entered in said user alterable field.

17. The data processing system of claim 16 further comprising circuitry operable for generating a first one said one or more network communication links corresponding to one or more message subsections, wherein said first one of said network communication links includes said subsection link.

18. The data processing system of claim 16 wherein said subsection link conforms to a preselected document formatting language.

19. A program product embodied in a tangible storage medium, the program product including a program of instructions for organizing electronic messages, the program of instructions for performing the steps of:
parsing each message to determine a presence of one or more network communication link identifiers;
adding a detected one of said one or more network communication links to a user accessible index; and
adding one or more network communication links corresponding to one or more message subsections in said index, said one or more subsections being selectively generated in response to user input, said network communication links being operable for accessing a corresponding message information.

20. The program product of claim 19 further comprising instructions for performing the steps of:
automatically generating said one or more subsections in response to a predetermined user input signal having a first value; and manually generating said one or more subsections in response to said predetermined user input signal having a second value.

21. The program product of claim 20 wherein said instructions for performing the step of automatically generating said one or more subsections comprises instructions for performing the steps of:
scanning a selected message;
detecting a presence of one or more predetermined subsection identifiers; and
inserting a link corresponding to a detected one of said subsection identifiers in said selected message.

22. The program product of claim 21 further comprising instructions for performing the step of generating a first one said one or more network communication links corresponding to one or more message subsections, wherein said first one of said network communication links includes said link corresponding to said detected one of said subsection identifiers.

23. The program product of claim 21 wherein said link conforms to a preselected document formatting language.

24. The program product of claim 23 further comprising instructions for performing the steps of:
determining if each message is in said preselected document formatting language; and
if a message is not in said preselected document formatting language, formatting said message in said document formatting language.

25. The program product of claim 20 wherein said instructions for performing step of automatically generating said one or more subsections comprises instructions for performing the steps of:
selecting a portion of text of a selected message in response to user input;
displaying a user interface having a user alterable field operable for receiving subsection information;
inserting a subsection link in said portion of text corresponding to subsection information entered in said user alterable field.

26. The program product of claim 25 further comprising instructions for performing the step of generating a first one said one or more network communication links corresponding to one or more message subsections, wherein said first one of said network communication links includes said subsection link.

27. The program product of claim 25 wherein said subsection link conforms to a preselected document formatting language.

* * * * *